(12) United States Patent
Goh et al.

(10) Patent No.: US 6,215,266 B1
(45) Date of Patent: Apr. 10, 2001

(54) SYSTEM AND METHOD FOR LOW ACOUSTIC NOISE SPINDLE MOTOR COMMUTATION

(75) Inventors: Nan Ling Goh; James Lai Kein Chang; Yam Pheng Tham; Utt Heng Kan; Kah Liang Gan, all of Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/100,761

(22) Filed: Jun. 17, 1998

Related U.S. Application Data
(60) Provisional application No. 60/056,029, filed on Sep. 2, 1997.

(51) Int. Cl.[7] .................................................... H02P 6/20
(52) U.S. Cl. ........................... 318/439; 318/430; 318/702
(58) Field of Search .................................. 318/138, 254, 318/430, 431, 439, 700, 701, 702

(56) References Cited

U.S. PATENT DOCUMENTS

| 4,334,254 | | 6/1982 | Baker et al. ............................... 361/9 |
| 5,260,607 | * | 11/1993 | Kinbara ................................. 307/253 |
| 5,449,988 | * | 9/1995 | Gurstein et al. ....................... 318/430 |
| 5,874,826 | * | 2/1999 | Chen et al. ............................ 323/222 |

* cited by examiner

*Primary Examiner*—Bentsu Ro
(74) *Attorney, Agent, or Firm*—Merchant & Gould P.C.

(57) ABSTRACT

A system for low acoustic noise spindle motor commutation is disclosed. The system contains a control device that generates commutation control signals which cause spindle motor drivers to source or sink current through windings of a spindle motor. The windings create electromagnetic fields which induce rotational movement in a spindle motor rotor. Low acoustic noise snubber devices are coupled to each winding and are dynamically configurable by the control device to provide low spindle motor driver charging current upon initial application of power to the spindle motor, and reduced acoustic noise and back EMF-generated current and voltage surges at the spindle motor driver during spindle motor commutation.

12 Claims, 2 Drawing Sheets

SYSTEM AND METHOD FOR LOW ACOUSTIC NOISE SPINDLE MOTOR COMMUTATION

CROSS-REFERENCE TO RELATED APPLICATIONS

Embodiments of this invention relate to Provisional Application Ser. No. 60/056,029, filed Sep. 2, 1997. The contents of that application are incorporated by reference herein.

BACKGROUND OF THE INVENTION

1. Field of the Invention

Embodiments of this invention relate generally to spindle motors of disk drives of the type generally used for storing digital data, and in particular embodiments to methods for generating low acoustic noise spindle motor commutation, and disk drive systems incorporating the same.

2. Description of Related Art

Modem computers require media in which digital data can be quickly stored and retrieved. Magnetizable (hard) layers on disks have proven to be a reliable media for fast and accurate data storage and retrieval. Disk drives that read data from and write data to hard disks have thus become popular components of computer systems. To access memory locations on a hard disk, a read/write head is positioned over the hard disk, and the hard disk rotates at an essentially constant velocity. By moving the read/write head radially over the rotating hard disk, all memory locations on the hard disk can be accessed.

A spindle motor coupled to a spindle and the hard disk is often used to rotate the hard disk at an essentially constant velocity. Spindle motors are often brushless DC motors, which develop torque by the interaction of radial magnetic fields produced by permanent magnets on the rotor and rotating radial magnetic fields produced by sequencing alternating currents in the multi-phase windings of the stator. Rotation of the rotor occurs as the rotor's magnetic fields, and hence its permanent magnets, "follow" the rotating magnetic fields of the stator.

A plurality of spindle motor drivers repetitively source and sink current through the stator windings to produce the alternating currents in the windings, with each winding's alternating current maintaining a fixed phase relationship with respect to the alternating currents in the other windings. This phasing of alternating current in the windings of a motor is known as commutation. Because each winding acts essentially as an inductor, as the current in each winding changes direction at the switching frequency of its corresponding spindle motor driver, the reduction of current flowing through the winding causes its magnetic field to collapse, producing a back electromotive force (EMF) across the winding. The back EMF causes a surge voltage and a corresponding surge current to appear at the spindle motor driver at the switching frequency of the spindle motor driver. The repetitive switching of current in the winding results in a fluctuating magnetic field, creating a voice-coil effect with small forces of attraction and repulsion between the winding and the adjacent housing causing slight vibrations and acoustic noise at the switching frequency.

Snubber circuits are often coupled between each winding and ground to reduce the surge voltages and currents caused by the back EMF. An example of a snubber circuit is disclosed in U.S. Pat. No. 4,334,254, incorporated herein by reference. Capacitive snubber circuits suppress voltage transients by supplying a discharge path between the inductive winding and ground, but require high charging currents when the spindle motor drivers are sourcing current into the windings. High charging current is undesirable because it increases the power dissipation of transistors in the spindle motor drivers, requiring more expensive larger-geometry transistors.

To minimize these charging currents, a resistance is often included in series with the snubber capacitance. The resistance provides a resistive charging path for the capacitor, slowing down the charging rate of the capacitor and decreasing the instantaneous current sourcing requirements of the spindle motor drivers. The reduced charging current rate is also beneficial because many spindle motor driver circuits rely on a specific current ramp profile during the initial application of power to the spindle motor to determine the start phase of commutation, and without the resistance the high charging currents would distort the current ramp profile and introduce commutation start-up errors.

However, the resistance also creates drawbacks. The resistance impedes the flow of current through the capacitance to ground during spindle motor commutation, reducing the ability of the capacitance to suppress voltage transients, surge currents, and acoustic noise.

SUMMARY OF THE DISCLOSURE

Therefore, it is an object of embodiments of the invention to provide a system and method for reducing the voltage transients, surge currents, and acoustic noise generated during spindle motor commutation by decreasing the resistance and increasing the capacitance of discharge paths between the windings and a reference voltage.

It is a further object of preferred embodiments of the invention to provide a system and method for reducing the acoustic noise generated during spindle motor commutation by decreasing the resistance and increasing the capacitance of discharge paths between the windings and a reference voltage, while causing minimal disturbance to the start-up current ramp profile and ensuring the proper start-up of commutation by increasing the resistance and decreasing the capacitance of the discharge paths during the initial application of power to the spindle motor.

These and other objects are accomplished according to a system for low acoustic noise spindle motor commutation. The system contains a control device that generates commutation control signals which cause spindle motor drivers to source or sink current through windings of a spindle motor. The windings create electromagnetic fields which induce rotational movement in a spindle motor rotor. Low acoustic noise snubber devices are coupled to each winding and are dynamically configurable by the control device to provide low spindle motor driver charging current upon initial application of power to the spindle motor, and reduced acoustic noise and back EMF-generated current and voltage surges at the spindle motor driver during spindle motor commutation.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention. For example, although the drawings reference a three-phase brushless DC motor with windings located on the stator, it is understood that other multi-phase implementations fall within the scope of preferred embodiments of the present invention, including excited rotor, hysteresis, and reluctance-type synchronous motors. In addition, other types of motors utilizing commutation, including induction motors, fall within the scope of preferred embodiments of the present invention, and that in alternate embodiments the windings may also be located on the rotor. Furthermore, although the description and drawings reference a disk drive spindle motor commutation system, snubber devices according to embodiments of the present invention may be used with any system where acoustic noise is generated by repeatedly switching the direction of current flow through inductive loads.

Modern computers require media in which digital data can be quickly stored and retrieved. Magnetizable (hard) layers on disks have proven to be a reliable media for fast and accurate data storage and retrieval. Disk drives that read data from and write data to hard disks have thus become popular components of computer systems. To access memory locations on a hard disk, a read/write head is positioned over the hard disk, and the hard disk rotates at an essentially constant velocity. By moving the read/write head radially over the rotating hard disk, all memory locations on the hard disk can be accessed. A spindle motor coupled to a spindle and the hard disk is often used to rotate the hard disk at an essentially constant velocity.

Figure 1:
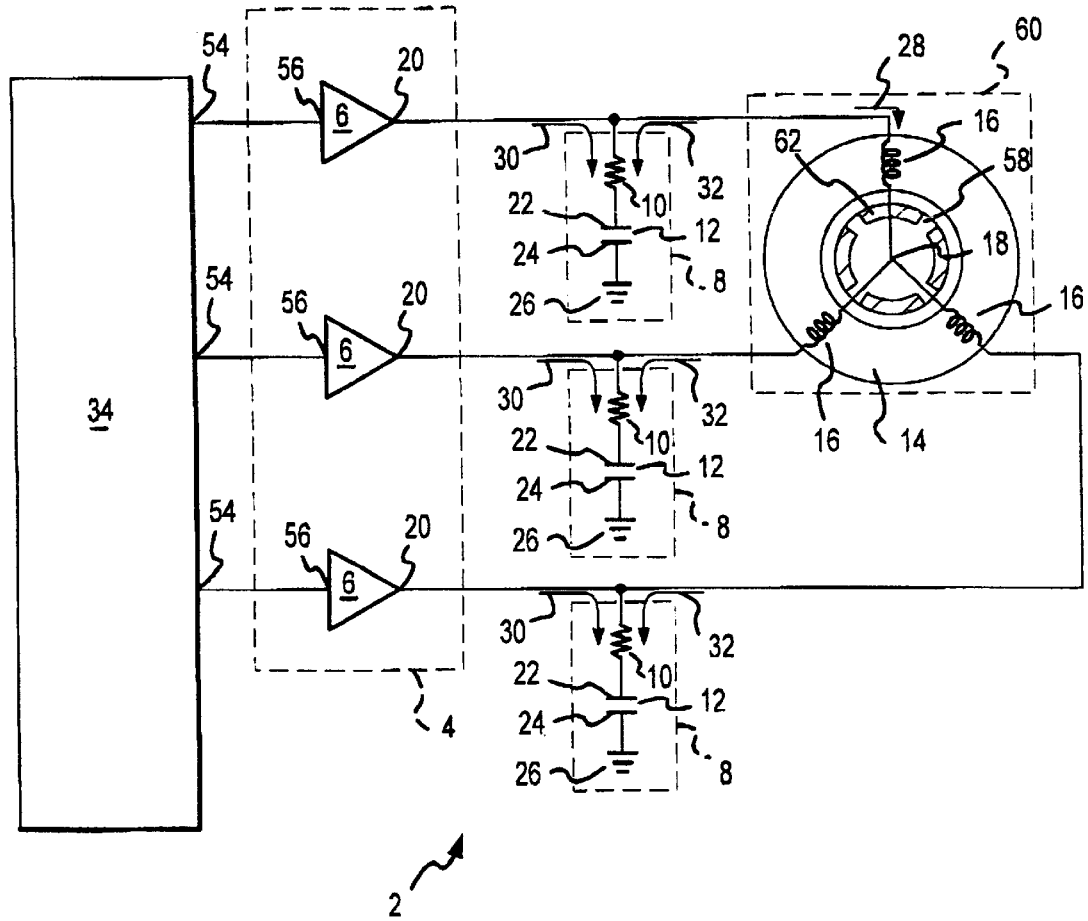
FIG. 1 is a schematic diagram of a spindle motor commutation system.

FIG. 1 illustrates a prior art example of a spindle motor commutation system 2 for use in a disk drive system. The spindle motor commutation system 2 comprises a control device 34, spindle motor driver circuit 4 containing a plurality of spindle motor drivers 6, a plurality of snubber devices 8, and a spindle motor 60 containing a spindle motor rotor 58, a spindle motor stator 14, and a plurality of stator windings 16. Each stator winding 16 is coupled between an output node 20 of a corresponding spindle motor driver 6 and a star node 18. Each snubber device 8 comprises a snubber resistive device 10 and a first snubber capacitive device 12 having a first end 22 and a second end 24. Each snubber resistive device 10 is coupled between the output node 20 of a corresponding spindle motor driver 6 and the first end 22 of a corresponding first snubber capacitive device 12. Each second end 24 of the first snubber capacitive devices 12 is coupled to a reference voltage 26 (for example, ground). The control device 34 includes a plurality of commutation control terminals 54, each coupled to an input node 56 of a single spindle motor driver 6.

The operation of one stator winding 16 and associated spindle motor driver 6 and snubber device 8 will now be described. It should be noted that this description applies similarly to the other stator windings 16, or windings located on the spindle motor rotor 58. In operation, a current 28 flows through the stator winding 16, either in the direction of the arrow (see FIG. 1) or opposing it. When current 28 flows in the direction of the arrow ("positive" current flow), the spindle motor driver 6 sources the current 28 and the output node 20 associated with the spindle motor driver 6 is at a voltage state greater than the reference voltage 26 (a "high" state). When current 28 flows in a direction opposing the arrow ("negative" current flow), the spindle motor driver 6 sinks the current 28 and the output node 20 associated with the spindle motor driver 6 is at a voltage state less than or equal to the reference voltage 26 (a "low" state).

When the direction of the current 28 is to be changed from negative to positive, the control device 34 configures the input node 56 of the corresponding spindle motor driver 6 to transition the output node 20 from a low state to a high state. Once the output node 20 is at a high state, current 28 begins to flow in the positive direction, and an additional charging current 30 flows through the corresponding snubber resistive device 10 to charge up the corresponding first snubber capacitive device 12. The snubber resistive device 10 impedes and limits the flow of charging current 30, minimizing the instantaneous output current and power dissipation requirements of the spindle motor driver 6.

When the direction of the current 28 is to be changed from positive to negative, the control device 34 configures the input node 56 of the corresponding spindle motor driver 6 to transition the output node 20 from a high state to a low state. Once the output node 20 is at a low state, current 28 begins to flow in the negative direction. As the current 28 in the stator winding 16 changes direction, the temporary reduction of current 28 flowing through the stator winding 16 causes its magnetic field to collapse, producing a back electromotive force (EMF) across the stator winding 16. The back EMF causes a surge voltage and a corresponding surge current to appear at the output node 20 of the spindle motor driver 6. The snubber device 8 reduces these surge voltages and currents by providing a capacitance in the first snubber capacitive device 12 which resists sudden changes in voltage and by supplying a path for discharge current 32 to flow to the reference voltage 26. However, the snubber resistive device 10 and any other resistance in the discharge path impedes the path of the discharge current 32 and limits the ability of the snubber device 8 to reduce the surge voltages and currents.

The current 28 through the stator winding 16 repetitively changes direction at a periodic rate, as controlled by the control device 34 and spindle motor driver 6. The remaining two stator windings in the three-phase spindle motor stator 14 of FIG. 1 also repetitively change direction at the same frequency. However, the current 28 in each stator winding 16 changes direction at a time 120 degrees out of phase with respect to the current changes in each of the other stator windings 16. This phased switching of current 28 in the stator windings 16 results in the generation of magnetic fields that appear to rotate about the spindle motor stator 14, and is known as spindle motor commutation. Rotation of the spindle motor rotor 58 is produced by electromagnetic forces upon the spindle motor rotor 58 created by rotating electromagnetic fields generated by the spindle motor commutation. Spindle motors are often brushless DC motors, which develop torque by the interaction of radial magnetic fields produced by permanent magnets 62 on the spindle motor rotor 58 and the rotating radial magnetic fields of the spindle motor stator 14. Rotation of the spindle motor rotor 58 occurs as the rotor's magnetic fields, and hence its permanent magnets 62, "follow" the rotating magnetic fields of the spindle motor stator 14.

Figure 2:
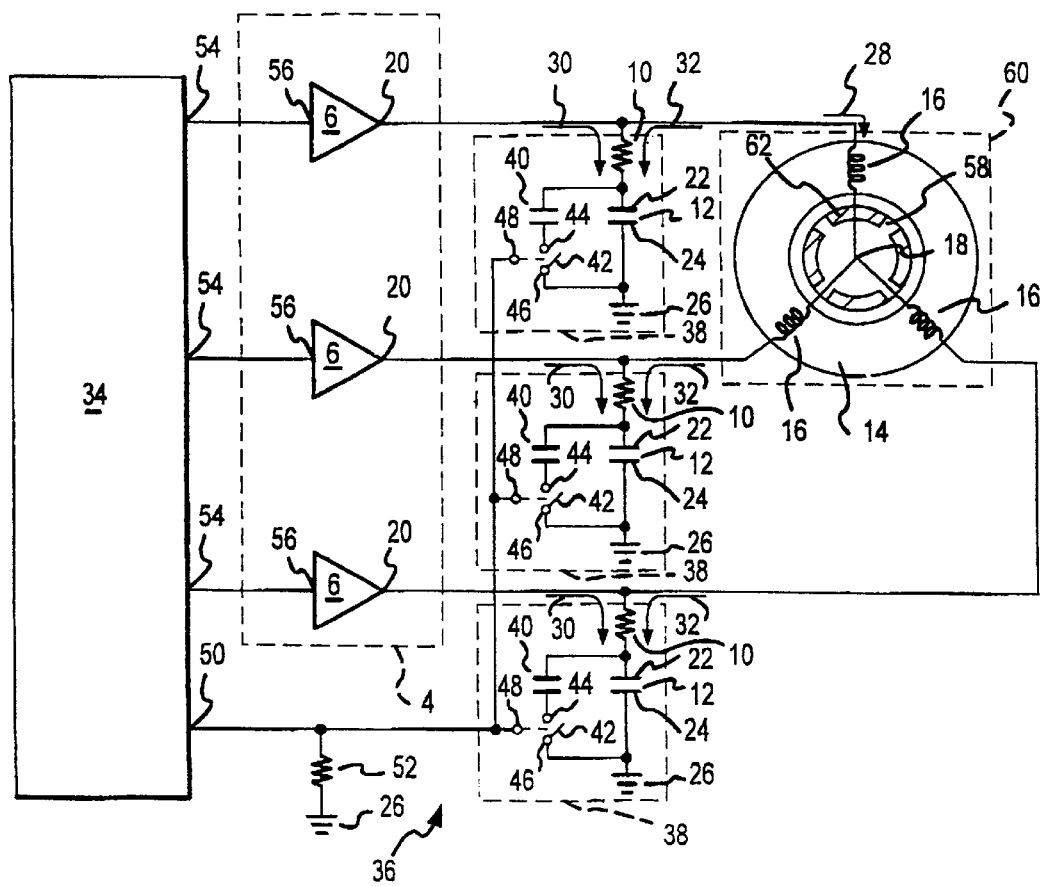
FIG. 2 is a schematic diagram of a spindle motor commutation system according to an embodiment of the present invention.
Figure 3:
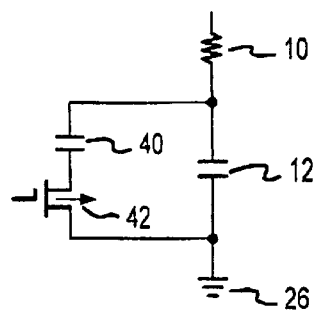
FIG. 3 is a schematic diagram of a low acoustic noise snubber device according to an embodiment of the present invention.

FIG. 2 illustrates an example of a spindle motor commutation system 36 for use in a disk drive system according to an embodiment of the present invention. The description of FIG. 1 is generally applicable to FIG. 2, except for the elements and operation of the snubber device 8 in FIG. 1. In FIG. 2, each snubber device 8 of FIG. 1 is replaced by a respective low acoustic noise snubber device 38. Each low acoustic noise snubber device 38 comprises a snubber resistive device 10, a first snubber capacitive device 12 having a first end 22 and a second end 24, a second snubber resistive device 40, and a switch 42 having an input terminal 44, and output terminal 46, and a control terminal 48. In preferred embodiments of a low acoustic noise snubber device 38 shown in FIG. 3, the switch 42 is a low drain-source on-resistance metal oxide semiconductor field-effect transistor (MOSFET) switch of less than one ohm. Referring again to FIG. 2, each snubber resistive device 10 is coupled between the output node 20 of a corresponding spindle motor driver 6 and the first end 22 of a corresponding first snubber capacitive device 12. Each second end of the first snubber capacitive devices 12 is coupled to a reference voltage 26. Each second snubber capacitive device 40 is coupled between the first end 22 of the corresponding first snubber capacitive device 12 and the input terminal 44 of the corresponding switch 42, while the output terminal 46 of the switch 42 is coupled to the reference voltage 26. The control terminal 48 of each switch 42 is coupled to the start-up control terminal 50 of the control device 34. In addition, a pull-down resistor 52 is coupled between the start-up control terminal 50 and the reference voltage 26, to pull down the control terminals 48 of the switches 42 towards the reference voltage 26 when the start-up control terminal 50 is in its low state.

The second snubber capacitive device 40 is normally coupled in parallel with the first capacitive device 12 by having the control device 34 close the switch 42. In doing so, the parasitic resistances of the first and second snubber capacitive devices 12 and 40 are paralleled, decreasing the equivalent resistance of the low acoustic noise snubber device 38 and further reducing current surges caused by the back EMF by providing a less resistive discharge path to the reference voltage 26. In addition, the equivalent capacitance of the low acoustic noise snubber device 38 is increased, further reducing voltage surges caused by the back EMF.

Upon the initial application of power to the spindle motor, many spindle motor driver circuits trigger the start of spindle motor commutation by sensing a particular output current level being sourced by the spindle motor drivers. The current ramp profile must therefore be well-defined to ensure proper start up of commutation. However, low impedance in associated snubber devices allows the snubber capacitor to charge rapidly, which can produce an unacceptable current spike in the current ramp profile. In embodiments of the present invention, the addition of the second snubber capacitive device 40 lowers the overall resistance of the low acoustic noise snubber device 38 and may result in a sharp and unpredictable current ramp profile, creating problems in the start-up of commutation.

To avoid this problem, in an embodiment of the present invention the control device 34 generates a high voltage at a start-up control terminal 50 only during the initial application of power to the spindle motor. This high voltage at the start-up control terminal 50 configures the switches 42 to be open, effectively removing the second snubber capacitive device 40 from the low acoustic noise snubber device 38. Without the second snubber capacitive device 40, the overall resistance of the low acoustic noise snubber device 38 is increased while its capacitance is decreased, reducing the charging current 30 and producing a smoother current ramp profile for the spindle motor drivers 6. The smooth current ramp allows proper commutation start-up for those spindle motor driver chips that rely on a consistent current ramp profile.

Once the spindle motor has attained a preset speed, the control device 34 generates a low voltage at the start-up control terminal 50. A pull-down resistor 52 pulls down the low voltage at the start-up control terminal 50 towards the voltage reference 26. This low voltage at the start-up control terminal 50 configures the switches 42 to be closed, effectively adding the second snubber capacitance 40 back into the low acoustic noise snubber device 38. With the second snubber capacitance 40 in the circuit, the overall resistance of the low acoustic noise snubber device 38 is decreased while its capacitance is increased, increasing the discharge current 32 and reducing the acoustic noise and current and voltage surges seen by the spindle motor drivers 6.

It should be understood that although the preceding discussion of an embodiment of the invention described a high voltage at the start-up control signal 50 to open the switch 42 upon the initial application of power, and a low voltage at the startup control signal 50 to close the switch 42 once a preset spindle motor speed is attained, in other embodiments of the invention the switch 42 may close when a high voltage appears at the start-up control signal 50, and may open when a low voltage appears. In such embodiments, the start-up control signal 50 will be at a low voltage upon the initial application of power, and will be at a high voltage once a preset spindle motor speed is attained.

Therefore, according to the foregoing description, preferred embodiments of the present invention will result in proper start-up of spindle motor commutation upon the initial application of power to the spindle motor, and reduced current and voltage surges and acoustic noise during repetitive spindle motor commutation.

The foregoing description of preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. A system for low acoustic noise spindle motor commutation, comprising:

a control device for generating a plurality of commutation control signals;

a plurality of spindle motor drivers responsive to the commutation control signals for spindle motor commutation;

a spindle motor responsive to signals from the spindle motor drivers, the spindle motor having a spindle motor rotor and a spindle motor stator, at least one of the spindle motor rotor and spindle motor stator having a plurality of windings for inducing movement in the spindle motor rotor; and a plurality of low acoustic noise snubber devices responsive to signals from the control device, each low acoustic noise snubber device being coupled to a corresponding stator winding and dynamically configurable by the control device to provide both lower resistance and higher capacitance and resultant lower spindle motor driver charging current upon application of power to the spindle motor, and higher resistance and lower capacitance and resultant reduced acoustic noise and back EMF-generated current and voltage surges at the spindle motor driver during spindle motor commutation.

2. The system of claim 1, wherein the control device includes a plurality of commutation control terminals for communicating the commutation control signals and a start-up control terminal for communicating a start-up control signal.

3. The system of claim 1, wherein each spindle motor driver comprises an input node for receiving a single commutation control signal and an output node responsive to the commutation control signal for sourcing or sinking current.

4. The system of claim 3, wherein each winding is coupled to the output node of a single spindle motor driver.

5. The system of claim 3, wherein each low acoustic noise snubber device is coupled to the start-up control terminal and the output node of a corresponding spindle motor driver.

6. The system of claim 1, wherein each low acoustic noise snubber device comprises:

a snubber resistive device for limiting charging current upon application of power to the spindle motor, the snubber resistive device having a first end coupled to an output node of a single spindle motor driver and a second end;

a first snubber capacitive device coupled between the second end of the snubber resistive device and a reference voltage for suppressing voltage surges during spindle motor commutation;

a switch responsive to the start-up control signal for coupling a second snubber capacitive device into the low acoustic noise snubber device, the switch having an input terminal, an output terminal coupled to the voltage reference, and a control terminal coupled to the start-up control terminal of the control device; and wherein the second snubber capacitive device is coupled between the second end of the snubber resistive device and the input terminal of the switch for decreasing the equivalent resistance and increasing the equivalent capacitance of the low acoustic noise snubber device when the switch is closed.

7. The system of claim 6, wherein the switch comprises a low drain-to-source on resistance MOSFET transistor.

8. The system of claim 6, further including a pull down resistor coupled between the reference voltage and the start-up control terminal for pulling down the voltage of the start-up control signal towards the reference voltage.

9. A method of minimizing acoustic noise during commutation of a spindle motor, the method comprising:

configuring low acoustic noise snubber devices individually coupled to stator windings of a spindle motor stator to a higher resistance, lower capacitance configuration during the initial application of power to the spindle motor, to limit startup charging currents and provide a predictable start-up current ramp profile;

sensing a preset point on the current ramp profile to trigger the start of spindle motor commutation; and configuring the low acoustic noise snubber devices to a lower resistance, higher capacitance configuration after the spindle motor has a attained a preset speed, to reduce acoustic noise and back EMF-generated current and voltage surges during spindle motor commutation.

10. The method of claim 9, wherein the low acoustic noise commutation device comprises:

a snubber resistive device for limiting charging current upon the initial application of power to the spindle motor, the snubber resistive device having a first end and a second end;

a first snubber capacitive device coupled between the second end of the snubber resistive device and a reference voltage for suppressing voltage surges during spindle motor commutation;

a switch for coupling a second snubber capacitive device into the low acoustic noise snubber device, the switch having an input terminal, an output terminal coupled to the voltage reference, and a control terminal; and a second snubber capacitive device coupled between the second end of the snubber resistive device and the input terminal of the switch for decreasing the equivalent resistance and increasing the equivalent capacitance of the low acoustic noise snubber device when the switch is closed; and wherein the step of configuring low acoustic noise snubber devices comprises the step of biasing the control terminals to either open the switches to decouple the second snubber capacitive devices from the low acoustic noise snubber devices, or close the switches to couple the second snubber capacitive devices into the low acoustic noise snubber devices.

11. The method of claim 10, wherein the switch comprises a low drain-to-source on resistance MOSFET transistor.

12. The method of claim 10, wherein the step of biasing the control terminal comprises either applying a high voltage state at the control terminal of the switch or applying a low voltage state at the control terminal of the switch and pulling down the control terminal voltage towards the reference voltage with a pull-down resistor coupled between the reference voltage and the control terminal of the switch.

* * * * *